(12) United States Patent
Alexander

(10) Patent No.: US 6,883,198 B2
(45) Date of Patent: Apr. 26, 2005

(54) LOADING DOCK WITH LIP PROTECTING BUMPERS

(75) Inventor: James C. Alexander, Coppell, TX (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/465,657

(22) Filed: Jun. 20, 2003

(65) Prior Publication Data
US 2003/0213073 A1 Nov. 20, 2003

Related U.S. Application Data

(63) Continuation-in-part of application No. 09/797,775, filed on Mar. 5, 2001, now abandoned.

(51) Int. Cl.[7] .................................................. E01D 1/00
(52) U.S. Cl. ........................................ 14/71.5; 52/173.2
(58) Field of Search ................................ 14/69.5, 71.1, 14/71.3, 71.5, 71.7; 414/401, 402; 52/173.2

(56) References Cited

U.S. PATENT DOCUMENTS

| | | | |
|---|---|---|---|
| 4,420,849 A | 12/1983 | Alten | |
| 4,641,388 A | 2/1987 | Bennett et al. | |
| 5,881,414 A | 3/1999 | Alexander | |
| 6,006,389 A | 12/1999 | Alexander | |
| 6,070,203 A | 5/2000 | Hawkins et al. | |
| 6,081,954 A | 7/2000 | Palmersheim et al. | |
| 6,098,227 A | * 8/2000 | Meichtry et al. | ............ 14/69.5 |
| 6,240,587 B1 | * 6/2001 | Meichtry et al. | ............ 14/69.5 |
| 6,360,394 B1 | 3/2002 | Hahn | |
| 6,405,397 B1 | 6/2002 | Alexander | |
| 6,654,976 B1 | * 12/2003 | Digmann et al. | ............ 14/69.5 |
| 2002/0162179 A1 | * 11/2002 | Hahn et al. | ............ 14/71.1 |
| 2004/0025267 A1 | * 2/2004 | Hahn et al. | ............ 14/71.3 |

* cited by examiner

Primary Examiner—Robert E. Pezzuto
Assistant Examiner—Alexandra K. Pechhold
(74) Attorney, Agent, or Firm—Baker & Hostetler, LLP

(57) ABSTRACT

A dock leveler and installation thereof having a bumper assembly to protect the deck and the lip of the leveler. In one embodiment the dock leveler comprises a pivotable deck and a lip attached to the deck at one end thereof. A bumper is operably connected to the deck and moveable with the deck. The bumper is selectively moveable to protrude beyond the end of the deck to protect the dock leveler from impact. In another embodiment a dock leveler installation comprises a loading dock having a front face. A dock leveler is mounted at the loading dock and has a pivotable deck and a lip attached to the deck at one end thereof. A bumper is operably connected to the front face beneath the dock leveler and projecting in front of the lip when the lip is in a pendent position.

7 Claims, 10 Drawing Sheets

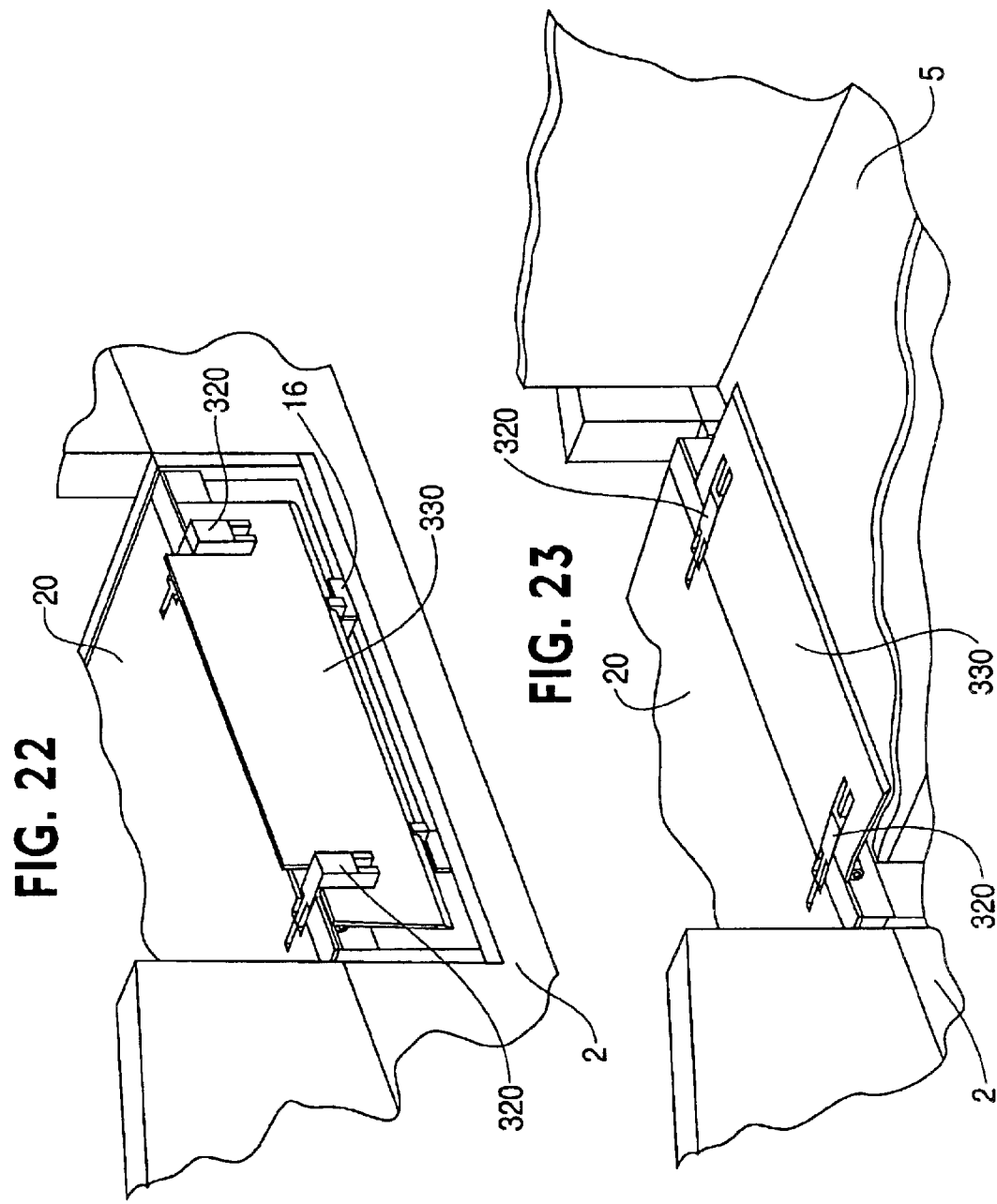

LOADING DOCK WITH LIP PROTECTING BUMPERS

This application is a continuation-in-part of U.S. patent application Ser. No. 09/797,775, filed Mar. 5, 2001, now pending which is incorporated herein by reference.

FIELD OF THE INVENTION

This invention relates to loading dock equipment and in particular to dock levelers that are used to span the distance between a loading dock and the bed of a vehicle. Specifically, it deals with a configuration for bumpers for use with a wider lip for a dock leveler that still protect the lip and the deck of the leveler from damage.

BACKGROUND OF THE INVENTION

A conventional loading dock for transport vehicles typically has a dock leveler with a dock bumper placed on each side of the lip at a fixed position on the dock face. The width of the dock leveler is usually limited to a maximum width of seven feet because if the bumpers are placed wider apart then there is a risk that the vehicle may miss the bumper and strike the dock leveler when it backs into position. Some specialty dock levelers are wider than seven feet to provide space for wider than normal cargo. Examples of these devices are shown in U.S. Pat. Nos. 5,881,414 and 6,070,203. A dock leveler with the bumpers mounted rigidly on the front as described in U.S. Pat. No. 6,070,203 may be unable to raise and extend the lip. A transport vehicle may be positioned against the bumpers with sufficient force to prevent the dock leveler from raising, or the top of the bumpers may strike a door hinge or other protrusion beyond the rear of the transport vehicle. By retracting the bumpers there is no interference to raising the dock. The bumper mounting shown in U.S. Pat. No. 6,070,203 could potentially have utility with the lip that extends linearly such as shown in U.S. Pat. No. 6,081,954. The hypothetical reason is that since the lip does not rotate down in front of the leveler there is no requirement for the lip and the bumpers to occupy the same space. However if the bumpers cannot be retracted they may interfere with the transport vehicle and prevent the leveler from raising to extend the lip. Consequently such a theoretical structure still has significant shortcomings.

U.S. Pat. No. 4,420,849 shows a dock leveler with bumpers that fold away to accommodate wide loads, but with all of these devices the width of lip is limited by the space between the dock bumpers.

U.S. Pat. No. 6,081,954 describes a dock leveler with a lip that extends linearly rather than rotating in the conventional manner. However the distance between the bumpers would still limit the width of the leveler.

SUMMARY OF THE INVENTION

Given the shortcomings of the prior art, there is a need for a dock leveler which has a lip that is wider than the distance between the dock bumpers yet still provides protection to both the vehicle and the dock equipment as the vehicle backs into position. Additionally, the traditional "bridge" function of the leveler lip must be maintained to eliminate any gap between the vehicle and the dock leveler deck. One method of shipping cargo has two rows of wheeled carts on a transport vehicle. When a row of carts is pulled from the transport vehicle onto the loading dock, the outer wheels of the carts will extend beyond the seven foot span of a conventional dock leveler lip. Thus the wheels of the cart may fall into the gap between the back of the transport vehicle and the front of the dock bumper, and the movement of the carts may be impeded.

This invention is a dock leveler that has a lip that is wider than the space between the dock bumpers. The dock bumpers protrude through openings in the lip plate to provide protection at the same location as conventional bumpers. The protruding portion of the bumper is preferably segmented so that width of each opening in the lip is narrower than the width of the wheels of the carts. Thus the lip may be almost as wide as the opening in the back of the transport vehicle and all the wheels of the cart may roll easily from the bed of the transport vehicle over the lip and onto the dock leveler. Another feature of the bumpers is that they are retractable to allow the dock leveler to raise and extend the lip.

While a specific object of this invention is to define a leveler having a wider lip, it is also apparent that another compatible object of this invention is to define a dock leveler system with improved bumper protection for the assembly. That is, the assembly may be a conventional width.

The first preferred embodiment of this invention is described as follows. A dock leveler is mounted in a recessed pit of conventional construction. The dock leveler may be as wide as necessary to provide access to the transport vehicle. A lip is mounted to the front of the deck of the leveler and pivoted in a conventional manner. The lip may be of conventional configuration where the back edge of the lip abuts the front of the deck when extended. It may also be of the "barrier lip" configuration where the rear of the lip is extended above the top of the deck to provide a run-off guard when the lip is pendent. While either lip configuration may be used with this invention, the "barrier lip" configuration will provide greater strength for the lip. A series of slotted holes is cut through the lip at each bumper. The width of each opening is preferably narrower than the width of the wheels travelling over the lip. A dock bumper of special configuration is mounted under each side of the deck and has segments which protrude through the slotted holes in the lip. Thus the front of the bumpers will contact the back of the transport vehicle to provide a space in front of the lip. The bumpers are mounted so that the front face of the bumper segments may be retracted behind the front of the lip so the leveler and lip may be raised without interference with the back of the transport vehicle.

The second preferred embodiment is similar to the first except that the dock leveler has a lip that retracts linearly rather than by rotation. Because the lip does not rotate down in front of the leveler there is no requirement for the bumpers to pass through the lip in the stored position. However the leveler must still be able to raise to extend the lip onto a transport vehicle that is higher than the dock floor. The bumpers are mounted so that they may be retracted to allow the leveler to raise without interference with the back of the transport vehicle.

The third preferred embodiment has conventional bumpers fastened to a carriage which is mounted for vertical motion along guide tracks fastened to the dock wall. The bumper carriage is constructed with vertical support plates so that a wide lip with slotted openings may fit between the vertical support plates and store behind the bumpers.

Thus the bumpers do not limit the width of the lip. Because the bumpers are always under the lip when the dock leveler is in the operative position, the bumpers may be spring biased toward the upper position. This would eliminate the need of a hydraulic positioning system such as that described by in U.S. Pat. No. 6,006,389. When the transport vehicle height is at or above the height of the dock then the lip will reach over the bumpers. When the transport vehicle is lower than the dock floor, the lip will contact the top of the bumpers and force them down to the proper height. This embodiment would also work with low docks where the upper position of the bumper is higher than the dock floor. As with the first preferred embodiment, the lip may be a conventional one or a run-off guard configuration.

The fourth preferred embodiment is similar to the third except that the bumper mounting brackets are fixed to the dock wall at a height that does not exceed the height of the bed of the transport vehicle. Transport vehicles lower than the height of the bumpers may be lifted to the desired height by the use of a truck leveler or wheel riser ramps, which are well known in the industry.

The fifth preferred embodiment has conventional dock bumpers mounted directly to the dock face. As in the fourth preferred embodiment transport vehicles lower than the height of the bumpers may be lifted to the desired height by the use of a truck leveler or wheel riser ramps. A wide dock leveler of conventional construction but with a longer lip is mounted in a pit formed behind the dock wall. In the operative position the lip would reach over the dock wall and the bumpers to rest on the bed of the transport vehicle. When in the stored position the lip of the dock leveler is placed in a cavity formed in the pit behind the bumpers. This embodiment will work with dock levelers of other configurations including vertically stored with rigid or hinged lip, and horizontally stored linearly retracting lip.

This invention will be described in greater detail by referring to the attached drawing and the description of the preferred embodiment that follows.

BRIEF DESCRIPTION OF THE DRAWINGS

FIG. 22 is a perspective view of another embodiment in accordance with the invention showing the leveler stored and bumper segments extending through the lip.

FIG. 23 is a perspective view of the embodiment of FIG. 22 showing the lip resting on the bed of a transport vehicle.

DETAILED DESCRIPTION

Figure 1:
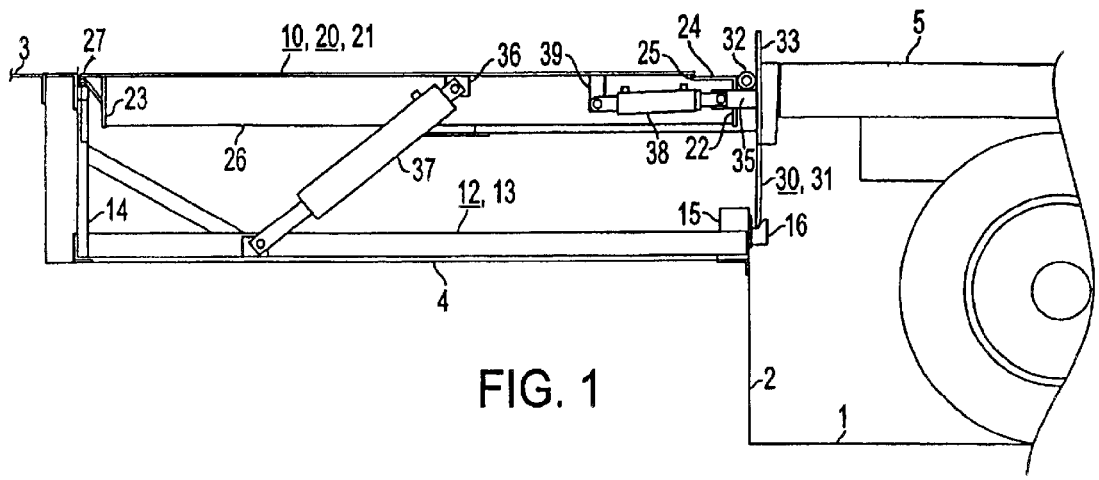
FIG. 1 is a sectional side view of the first preferred embodiment of this invention illustrating the dock configuration and the hydraulic cylinders that operate the leveler and the lip.

Referring now to FIGS. 1 through 6 the essential components of the first preferred embodiment of this invention will be described, it being understood that a typical dock leveler has other constructional features which need not be illustrated here. A loading dock is shown with a driveway approach 1, a dock face 2, and a dock floor 3 with a recessed pit 4. A transport vehicle 5 is shown positioned in front of the dock. The dock leveler 10 is typically mounted in the pit 4. It will be understood that this invention is not limited to any particular type of dock leveler, whether pit or vertically storing, or the mode of powering the deck and lip. The pit type is most common and will be used for purposes of explanation.

A frame 12 has horizontal members 13 and a vertical brace 14 both of which rest in the pit. The leveler frame also has stop blocks 15 and lip keepers 16 at the forward end of the horizontal members 13. The leveler 10 has a deck 20 which has a top plate 21, a bar 22 that forms a front header and a bar 23 that forms a rear header. A recessed ledge is formed at the front of the deck by a plate 24 and a spacer bar 25. Beams 26 attached to the top plate, ledge and header bars provide structural strength to the assembly. The deck 20 is pivoted to the frame at pivot 27.

A lip assembly 30 having a lip plate 31 and hinge tubes 32 is pivoted to the deck on a pin 28 inserted in hinge tubes 29 attached to the front header bar 21 and hinge tubes 32 attached to the lip plate 31. The leveler is held horizontal in the stored position with the lip 30 in the pendant position and retained in the lip keepers 16. The lip illustrated is of a configuration known in the industry by various names such as "Barrier Lip", "Safety Lip", "Run-Off Guard" Or "Post Office Lip". The characteristic feature of each is that lip 31 has an upper portion 33 which extends above the deck 20 when the lip is pendent. The purpose is to prevent wheeled vehicles from inadvertently running off the edge of an open dock. When the lip 30 is extended, the "Run-Off Guard" portion 33 of the lip rests in the recess of the deck 20 formed by the plate 24 as shown on FIG. 6. While preferred, the lip need not be a barrier type but may be simply one hinged at one end to the end of the deck, as is also conventional in loading docks.

Figure 7:
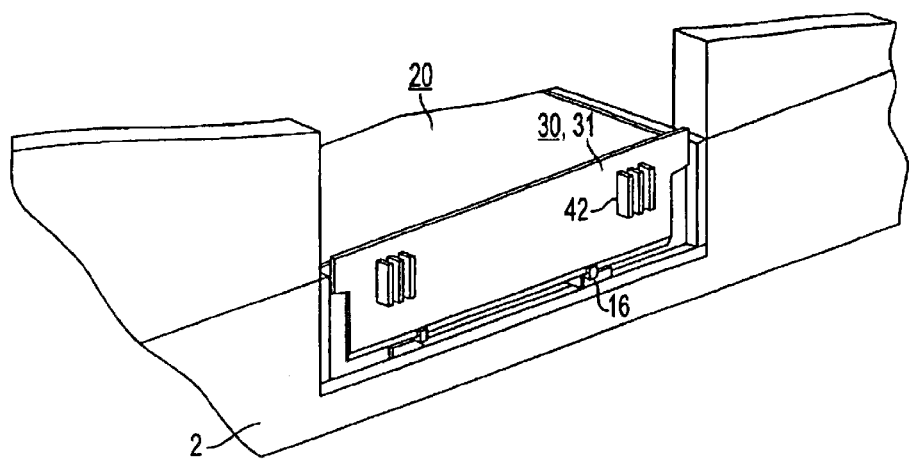
FIG. 7 is a perspective view of the first preferred embodiment of this invention with the leveler stored and illustrating the bumper segments extended through the lip to limit the position of the transport vehicle.
Figure 8:
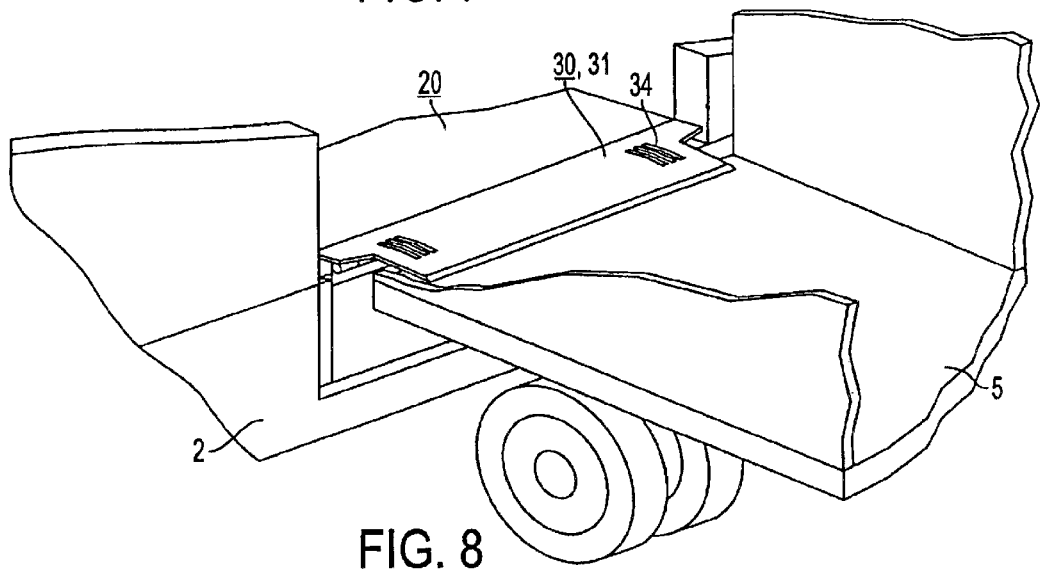
FIG. 8 is a perspective view of the first preferred embodiment of this invention with the lip resting on the bed of the transport vehicle.
Figure 9:
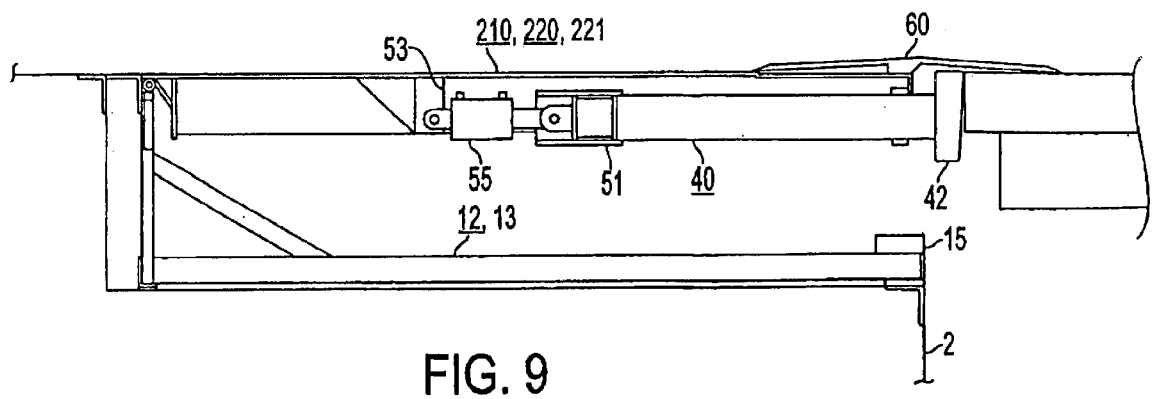
FIG. 9 is a sectional side view of the second preferred embodiment of this invention with the leveler in the operative position and the lip resting on the bed of the transport vehicle.

As illustrated in FIGS. 7, 8 and 9, slotted holes 34 are cut through the lip plate 31. These will be explained herein for the first embodiment of this invention.

FIG. 1 illustrates the configuration of a typical hydraulic system used to operate the dock leveler. An arm 34 is attached to the lip 30. Mounting brackets 36 and 39 are attached to the deck 20, and mounting brackets 17 are attached to the frame 12. A main cylinder 37 is pinned at one end to the brackets 36 and at the other end to the brackets 17. When hydraulic fluid is supplied to the cylinder the deck 20 will be lifted. Similarly the lip cylinder 38 is pinned at one end to the lip arm 33 and at the other end to the deck bracket 35. When hydraulic fluid supplied to either port of the cylinder 37 the lip 30 will be extended or retracted. A hydraulic system suitable for controlling the dock leveler of this type is described in U.S. Pat. No. 4,641,388.

Figure 2:
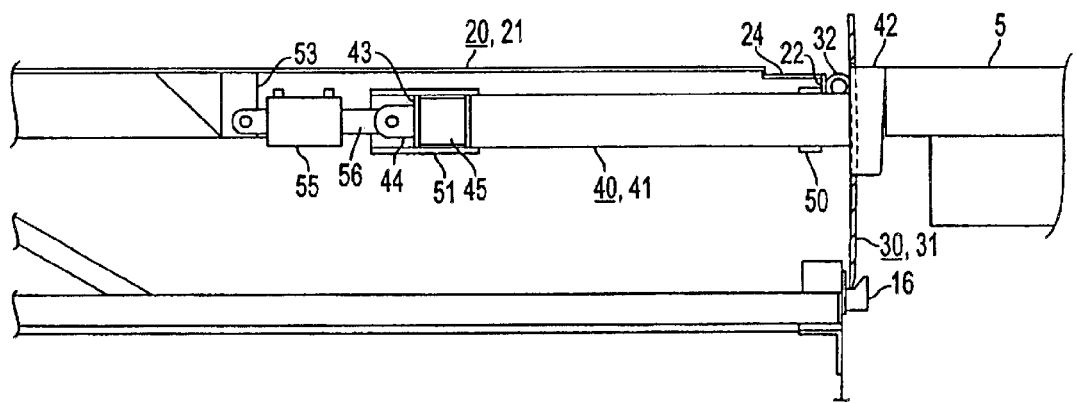
FIG. 2 is a sectional side view of the first preferred embodiment of this invention with the leveler stored and the bumpers extended to limit the position of the transport vehicle.
Figure 4:
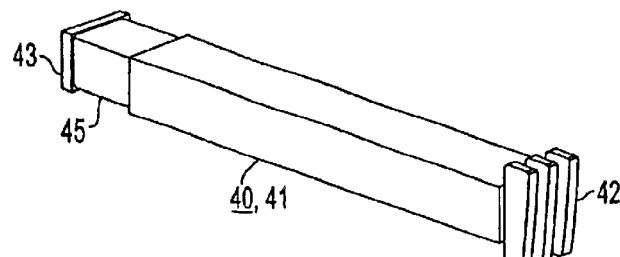
FIG. 4 is a perspective view of a bumper illustrating the beam and the bumper segments.

FIG. 2 illustrates the configuration of the retractable dock bumpers when the dock leveler is in the stored position. A bumper assembly 40 has a beam 41 and bumper segments 42. A plate 43 and mounting brackets 44 are attached to the rear of the bumper assembly. A resilient member 45 is attached between the front and rear sections of the bumper assembly 40 to absorb the impact force of the transport vehicle 5 backing into the dock. FIG. 4 illustrates a perspective view of the bumper assembly 40.

Figure 3:
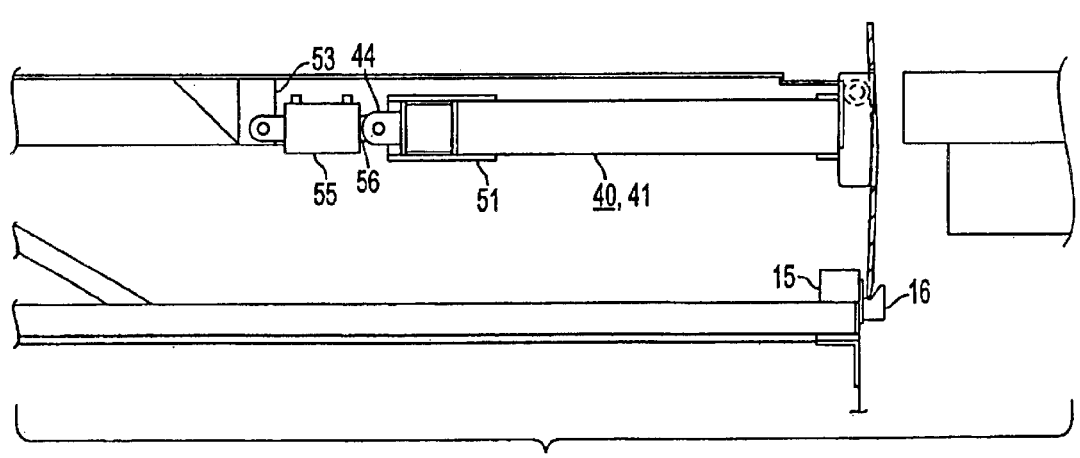
FIG. 3 is a partial sectional side view of the first preferred embodiment of this invention with the leveler stored and the bumpers retracted to allow the leveler to raise unimpeded by the transport vehicle.

Referring now to FIGS. 2 and 3, the bumper assemblies 40 are mounted for linear axial movement in the deck 20. An opening for each bumper is cut into the front header bar 22 and guide brackets 50 and 51 are attached to the deck 20. As illustrated in FIG. 2, the bumpers 42 are extended outward and project through the lip to block rearward movement of the vehicle even when the lip is in the pendant position. A cylinder anchor bracket 53 is also attached to the deck 20. A hydraulic cylinder 55 having an extendable rod 56 is pinned at one end to the anchor bracket 53 and at the other end to the brackets 44 on the bumper assembly 40. The rod 56 can be extended or retracted by supplying hydraulic fluid to either of the two ports on the cylinder 55.

Figure 5:
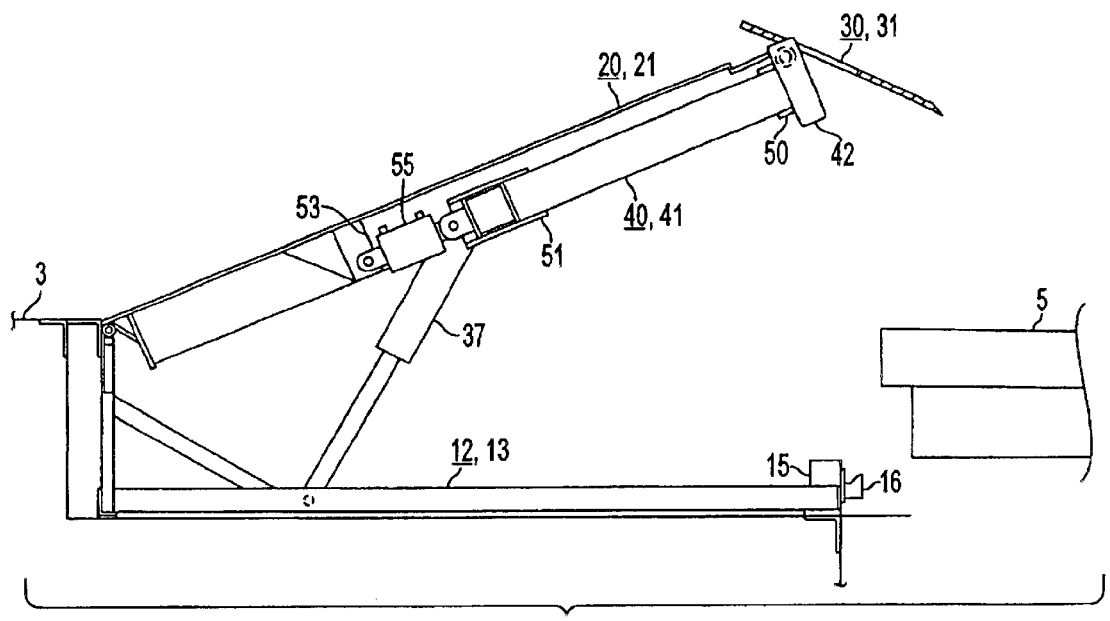
FIG. 5 is a sectional side view of the first preferred embodiment of this invention with the leveler raised and the lip partially extended.
Figure 6:
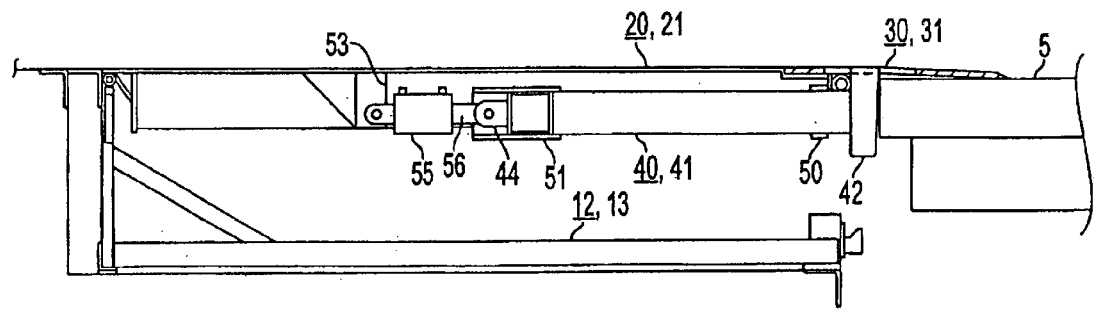
FIG. 6 is a sectional side view of the first preferred embodiment of this invention with the leveler lowered so that the extended lip is resting on the bed of the transport vehicle, and the bumpers extended to limit the position of the transport vehicle.

FIGS. 3, 5 and 6 show the condition of the bumpers at different phases of leveler deployment. FIG. 3 illustrates the leveler stored and the bumpers 42 retracted to allow the leveler to raise unimpeded by interference with the transport vehicle. FIG. 5 illustrates the deck 20 raised with the lip 30 partially extended. FIG. 6 illustrates the leveler in the operative position with the lip 30 extended and supported by the bed of the transport vehicle. The bumpers 40 are extended to limit the position of the transport vehicle 5.

Alternatively, the bumper can be mounted to the end of the deck to always protrude through the slots in the lip whenever the lip is in the pendant position such as illustrated in FIGS. 2 and 7. This will protect the deck and the lip. When the lip is raised the bumper will still protrude beyond the end of the deck as shown in FIG. 6 to protect the deck when the lip is supported by the bed of the parked vehicle. This is a modification of the first preferred embodiment to simplify the structure yet still protect the deck and lip at various stages of operation. In this configuration, the bumper may be resiliently mounted to the deck to absorb shock loads.

FIGS. 7 and 8 are perspective views of the first preferred embodiment which better illustrate the relationships of the bumper segments 41 and the slotted openings 34 in the lip plate 31. The hydraulic circuit that controls the extension and retraction of the bumper beams will preferably be designed so that when hydraulic pressure is applied to the main cylinder 37 then it is also applied to the retract port of the bumper cylinder 55. Thus whenever the weight of the deck 20 is supported by the hydraulic cylinder 37, the bumpers will then be retracted. When there is no hydraulic pressure applied to the main cylinder 37 then the deck must be supported either in the stored position by the lip keepers 17 or in the operative position by the lip resting on the bed of the truck. Therefore the bumpers may be extended whenever there is no hydraulic pressure exerted on the main cylinder 37. Such an hydraulic circuit is not shown but will be readily understood by those skilled in this art as easily implemented.

FIG. 9 illustrates a second preferred embodiment of this invention. The dock leveler 210 is of a similar configuration to the first embodiment except that the deck assembly 220 does not have hinge tubes to cant' a pivoting lip. The lip 60 is mounted to extend and retract linearly along the top of the deck 220. The dock leveler is shown with the lip 60 is fully extended and supported by the bed of the transport vehicle 5. The bumpers 40 are extended to limit the position of the transport vehicle 5.

Figure 10:
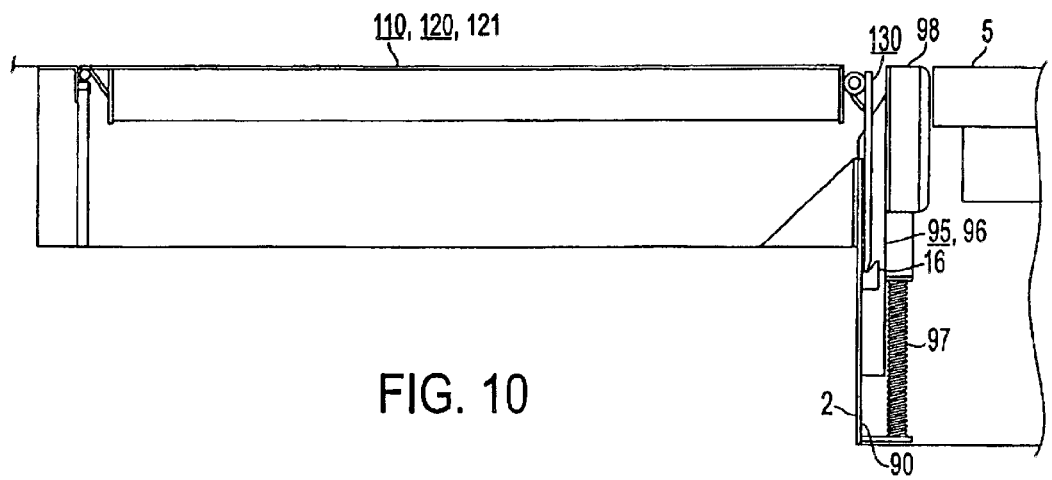
FIG. 10 is a sectional side view of the third preferred embodiment with bumpers mounted for vertical motion and a dock leveler having a hinged lip that stores within the bumper mounting brackets.
Figure 11:
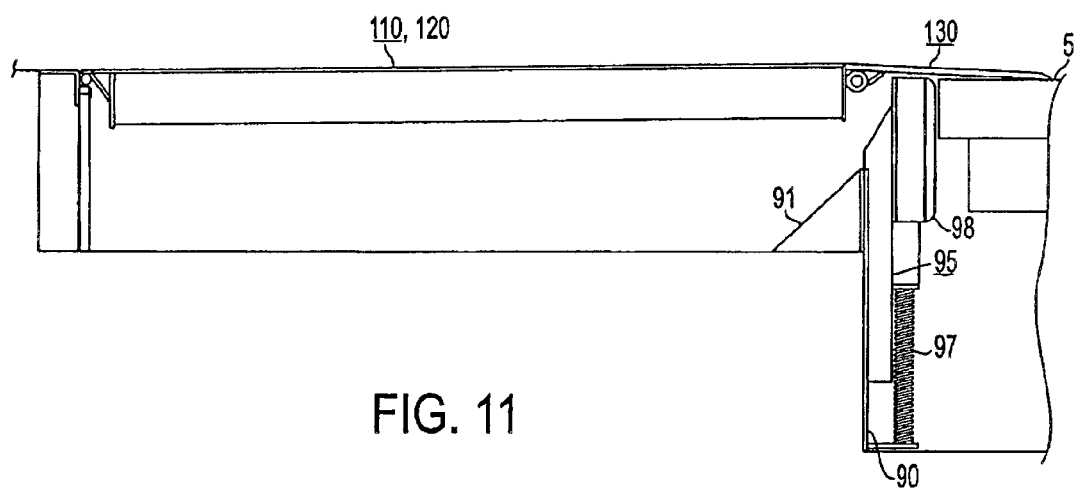
FIG. 11 is a sectional side view of the dock leveler of FIG. 10 with the dock leveler in an operative position resting on the bed of a transport vehicle that is not lower than the dock floor.
Figure 12:
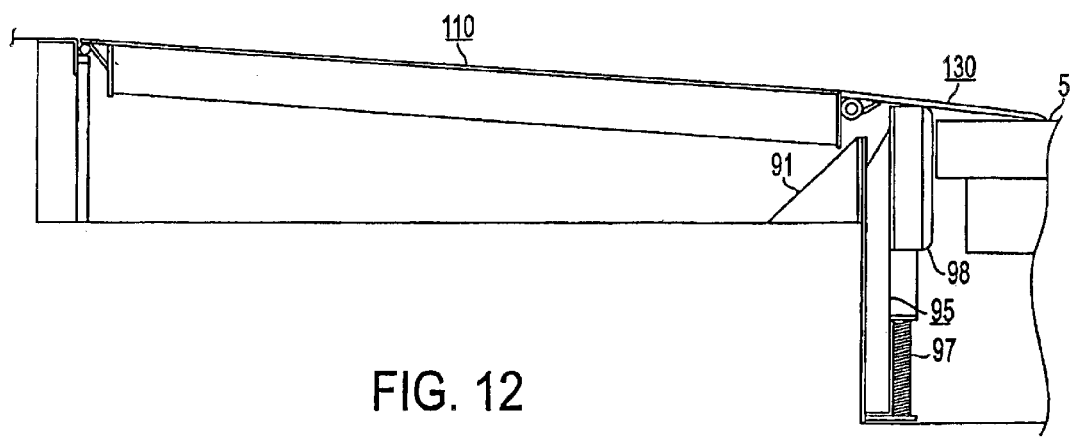
FIG. 12 is a sectional side view of the dock leveler of FIG. 10 with the dock leveler in an operative position resting on the bed of a transport vehicle that is lower than the dock floor.
Figure 13:
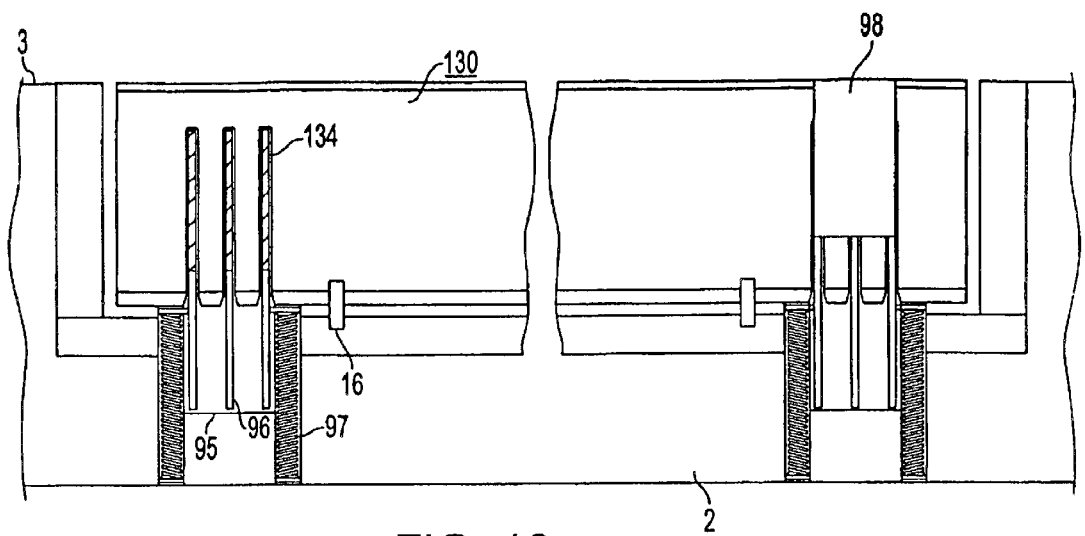
FIG. 13 is a front view of the dock leveler in FIG. 10.

A third preferred embodiment of this invention is illustrated by FIGS. 10 through 14. FIG. 10 shows a dock leveler 110 mounted in a conventional pit 4. The deck 120 has a conventional hinged lip 130 supported by lip keepers 16. A guide track 90 is mounted to the dock face 2 and may be supported by a bracket 91 attached to the floor of the pit 4. A bumper carriage 95 is mounted in the guide track 90. The bumper carriage 95 has vertical plates 96 that cant' conventional a dock bumper 98. The bumper carriage 95 is biased upward by springs 97 so that the top of the bumper 98 is at a suitable height for the highest transport vehicle. The lip 130 has a lip plate 131 with slotted openings 134 that allow the lip to fit in the cavities formed by the vertical support plates 96. This is illustrated by FIG. 13, a partial front view of the dock with a section cut through the left bumper to show the vertical plates 96 and slotted openings 134. Thus the lip 130 can be stored behind the bumpers and the width of the lip is not limited by the spacing of the bumpers. A transport vehicle may impact the bumpers with very high force when the dock leveler is stored. The bumper carriage may be constructed so that excessive force on the bumper will cause the bumper carriage to deflect until it contacts the dock leveler and transfer force through the dock leveler to the dock floor.

Figure 14:
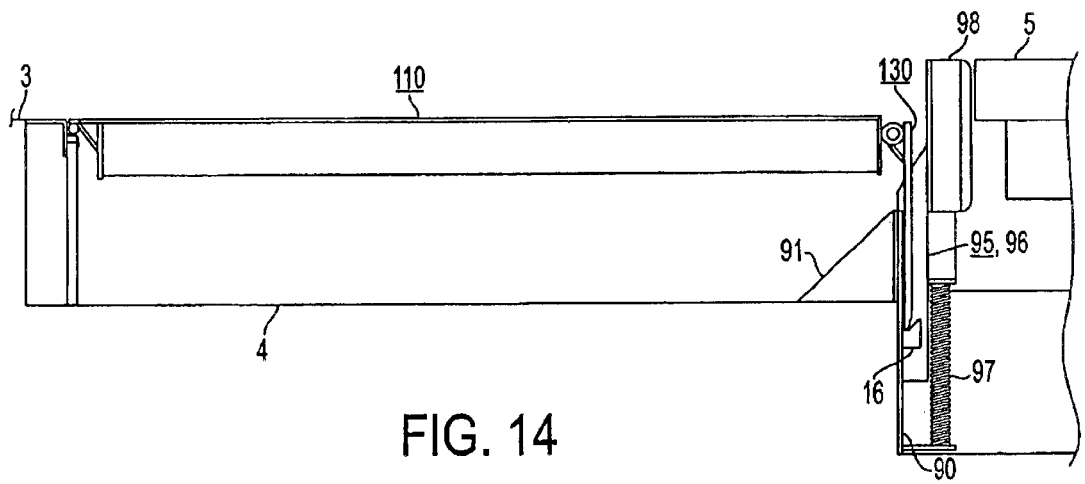
FIG. 14 is a sectional side view of the dock leveler in FIG. 10 with the bumpers higher than the dock floor.

FIG. 11 illustrates the dock leveler with the lip 130 extended and supported by the bed of the transport vehicle 5 which is higher than the top of the bumper 98. FIG. 12 shows a transport vehicle with a bed height lower than the dock floor 3. When the lip 130 is resting on the bed of the transport vehicle it also rests on top of the bumper 40 and depresses it to the proper height. Thus this embodiment will accommodate transport vehicles of varying heights. FIG. 14 shows the dock leveler installed in a low dock with the top of the bumpers 98 above the dock floor 3 to accommodate transport vehicles that are higher than the dock floor. This configuration of bumper mounting will work with dock levelers of all configurations including vertically stored with rigid lip, horizontally stored with pivoting lip or linearly retracting lip.

Figure 15:
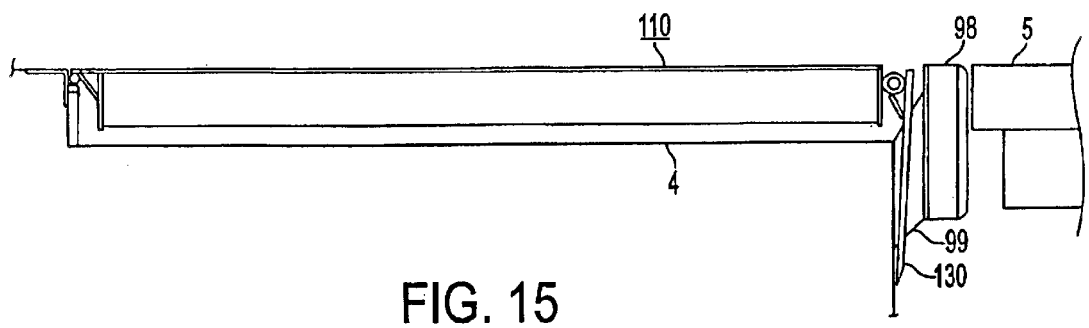
FIG. 15 is a sectional side view of the fourth preferred embodiment with fixed bumpers and a dock leveler having a hinged lip that stores within the bumper mounting brackets.
Figure 16:
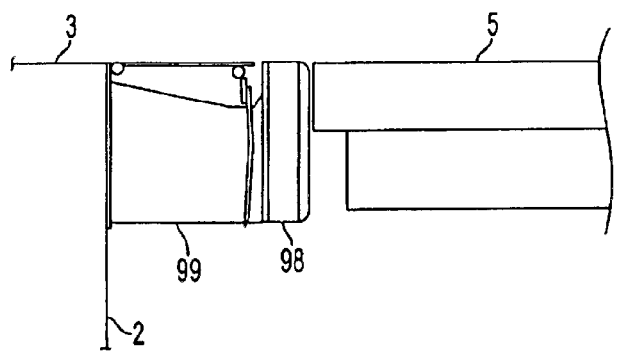
FIG. 16 is a sectional side view of the fourth preferred embodiment with fixed bumpers and an edge-of-dock leveler having a hinged lip that stores within the bumper mounting brackets.

A fourth preferred embodiment of this invention is illustrated in FIGS. 15 and 16. It is similar to the third preferred embodiment except that the dock bumpers 98 are mounted to vertical plates 97 that are mounted directly to the dock face 2. FIG. 15 shows the bumpers with a pit leveler and FIG. 16 shows the bumpers with an edge-of-dock leveler mounted directly to the dock face 2. With this embodiment a dock leveler with a lip of any width may be used to service transport vehicles that are not lower than the top of the bumpers 98. Lower transport vehicles may be raised to floor level with a truck leveler or wheel ramps.

Figure 17:
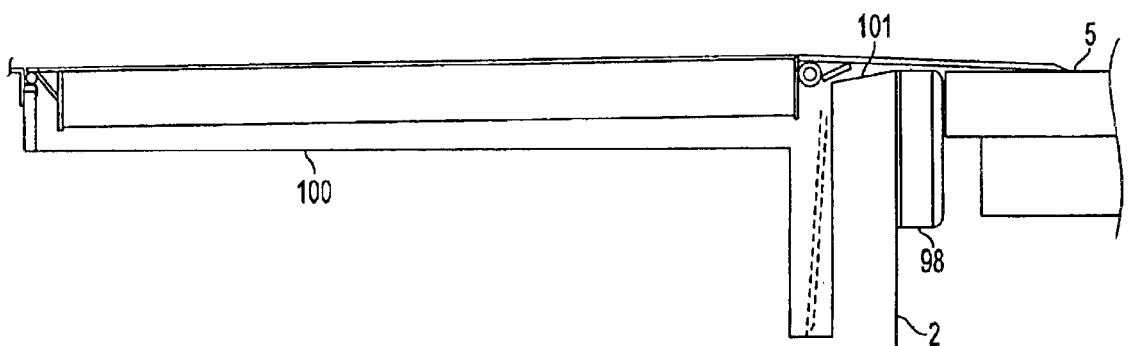
FIG. 17 is a sectional side view of the fourth preferred embodiment with fixed bumpers and a dock leveler having a hinged lip that stores in a recessed cavity behind the bumpers.
Figure 18:
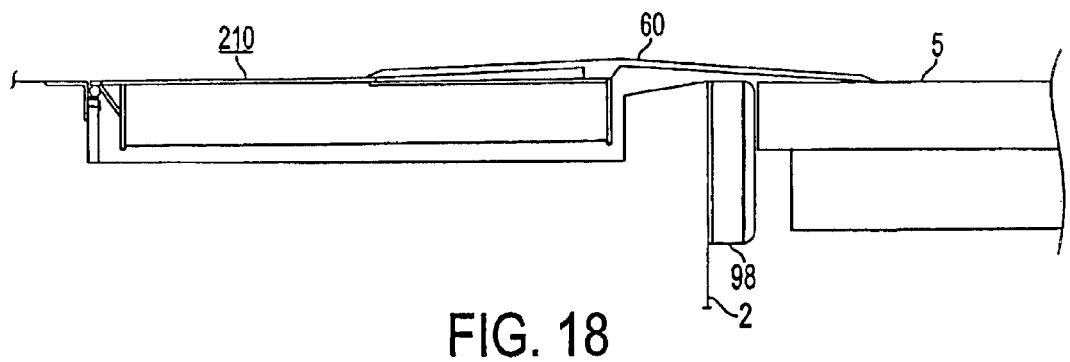
FIG. 18 is a side view of fixed bumpers with a dock leveler having a lip that extends linearly.

A fifth preferred embodiment of this invention is illustrated by FIGS. 17 and 18. FIG. 17 shows conventional dock bumpers 98 mounted directly to the dock face 2. A pit 100 formed behind the dock face forms a wall 101 to provide structural support to the bumpers. A recessed cavity is formed in the front of the pit to store the lip when it is retracted. A dock leveler 110 of conventional construction is mounted in a recessed pit and in the operative position the end of the lip plate 130 is supported by the bed of the transport vehicle 5. As in the case of the fourth embodiment, this embodiment allows a dock leveler with a lip of any width to be used to service transport vehicles that are not lower than the top of the bumpers 98. Lower transport vehicles may be raised with a truck leveler or wheel ramps.

FIG. 18 shows a dock of the same configuration as FIG. 17 except the dock leveler 210 has a lip 60 which is retracted and extended linearly. Thus the pit does not require the deep recess to store the lip.

It should be understood that while FIGS. 1–18 illustrate embodiments in which the lip extends beyond the outside edge of the bumpers, as the specification indicates any embodiment wherein the lip is wider than the distance between the bumpers can fall within the scope of this invention. In other words, for example, the lip may extend only partially the distance across the bumpers.

Figure 19:
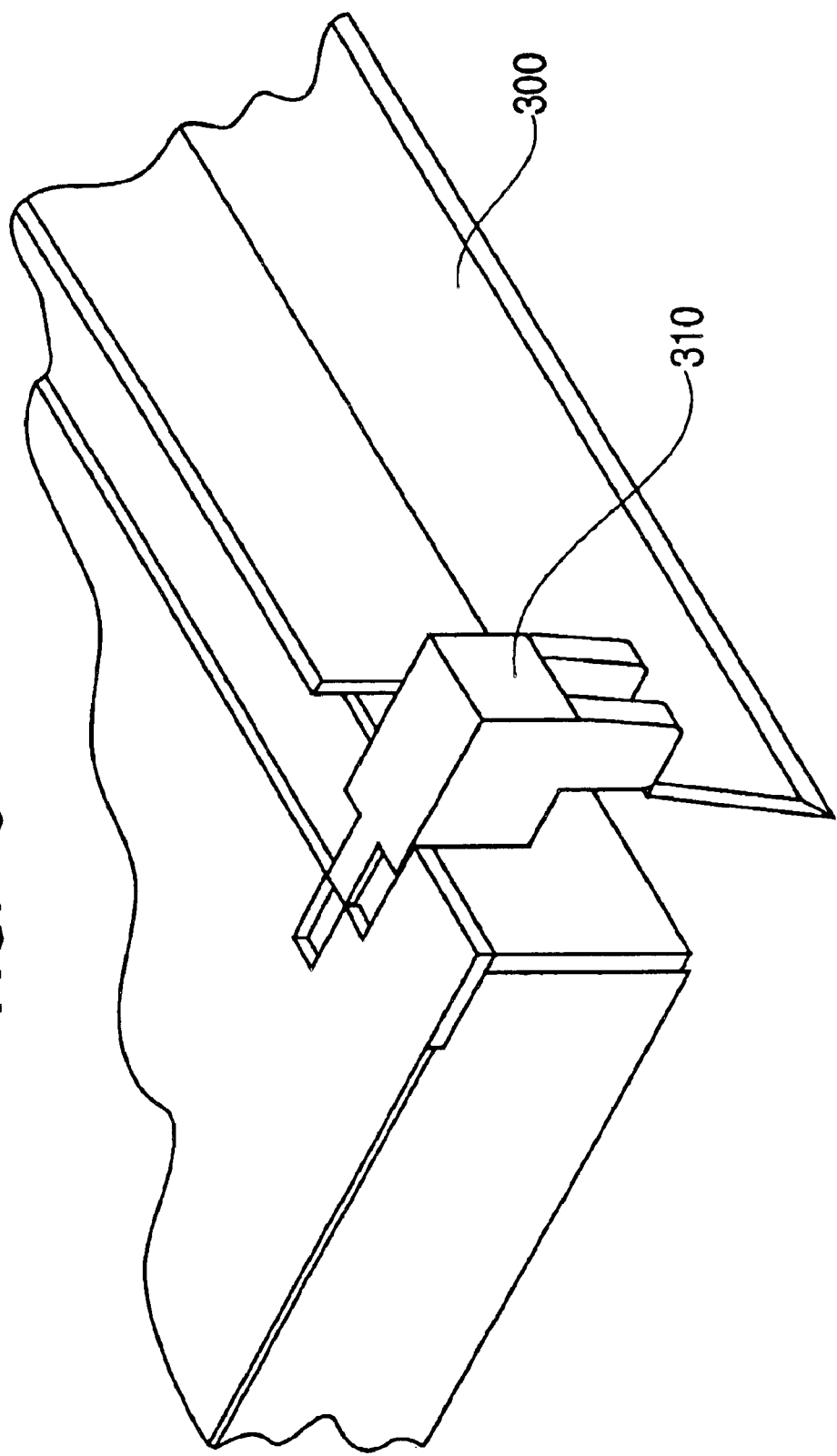
FIG. 19 is a partial view of another embodiment according to the invention, showing the bumpers extended and the lip retracted.
Figure 20:
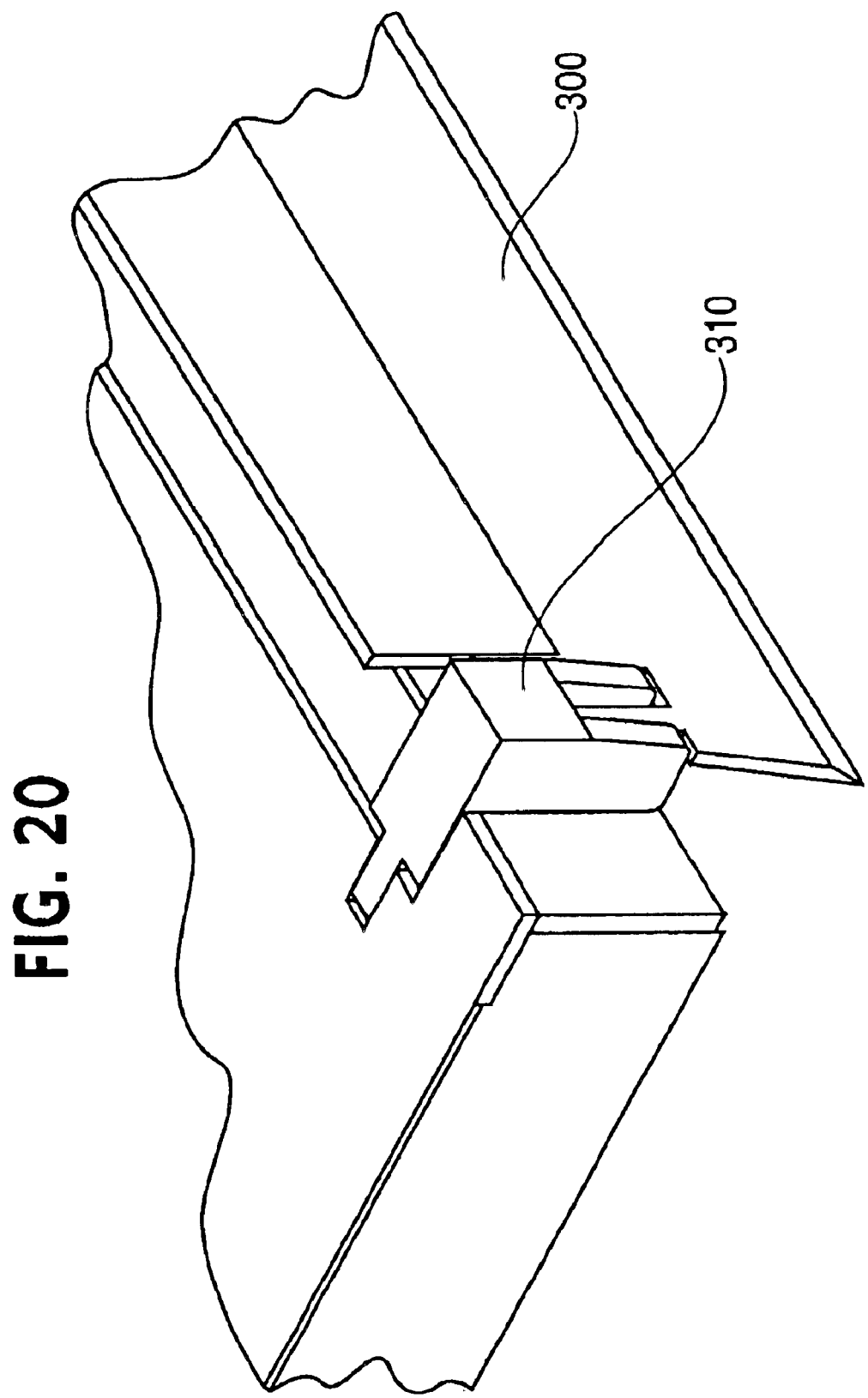
FIG. 20 is a partial view of the embodiment of FIG. 19 with both the bumpers and lip retracted.
Figure 21:
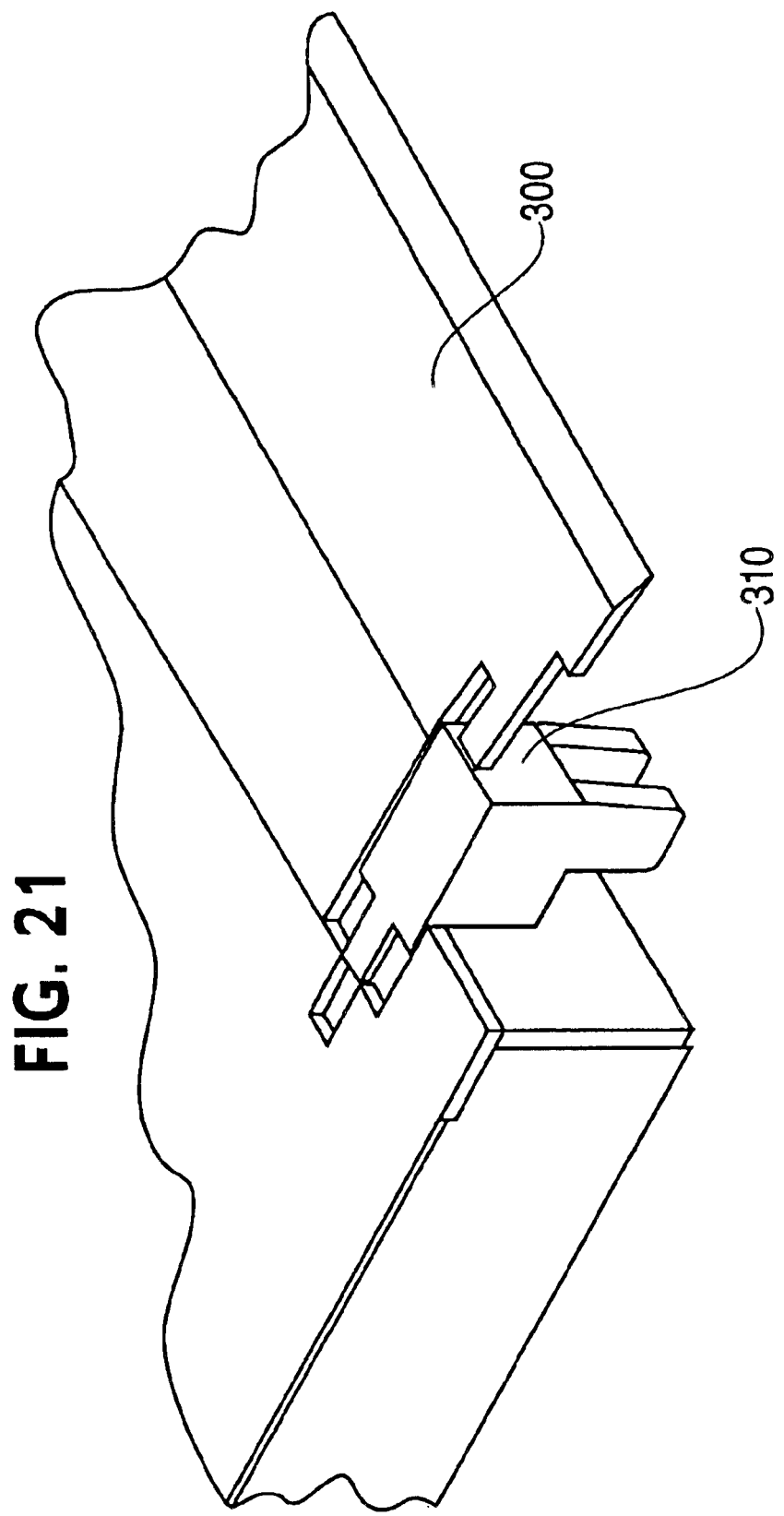
FIG. 21 is a partial view of the embodiment of FIG. 19 with both bumper and lip extended.

FIGS. 19–21 illustrate an embodiment wherein the lip 300 extends only partially across a bumper 310. FIG. 19 shows this embodiment with the bumpers 310 extended and the lip retracted 300. FIG. 20 shows the same embodiment of FIG. 19 with both the bumpers 310 and lip 300 retracted, and FIG. 21 shows the embodiment of FIG. 19 with both the bumpers 310 and lip 300 extended.

Another embodiment according to the present invention is illustrated in FIGS. 22–23. The action of the bumpers 320 in this embodiment is similar to the embodiment depicted in FIGS. 7 and 8. Whereas in the embodiment shown in FIGS. 7 and 8, the lip 330 is wider than the bumpers 320 and bumper segments protrude through holes in the lip, in this case the lip 320 is wider than the bumpers 320 but the lip 330 does not surround them.

While this invention has been described with respect to the preferred embodiments, it will be apparent to those skilled in this art that modifications of this invention may be practiced without departing from the scope of the invention. For example the bumpers may be extended and retracted by mechanical linkages or electric or pneumatic actuators rather than hydraulic cylinders. Similarly, the function of the resilient member 45 may be achieved by fitting a relief valve to the bumper cylinder 55 so that the energy of impact is dissipated through the hydraulic fluid.

What is claimed is:

1. A dock leveler installation comprising:
   a loading dock having a front face, a dock leveler mounted at said loading dock and having a pivotable deck and a lip attached to said deck at one end thereof, a first bumper operably connected to said front face beneath said dock leveler and projecting in front of said lip when said lip is in a pendent position, a second bumper spaced apart from the first bumper, the first and second bumper each having an inner edge and an outer edge, wherein the lip has a width larger than the space between the first bumper and second bumper.

2. A dock leveler installation according to claim 1, wherein the lip width is smaller than a distance measured from the outer edge of the first bumper to the outer edge of the second bumper.

3. A dock leveler installation according to claim 1, wherein the lip width is larger than a distance measured from the outer edge of the first bumper to the outer edge of the second bumper.

4. A dock level installation according to claim 3, wherein the lip surrounds the first bumper and the second bumper.

5. A dock leveler installation according to claim 1, wherein the first bumper and the second bumper are configured to extend away from the dock and retract toward the dock.

6. A dock leveler installation according to claim 5, wherein the first and second bumper are configured to extend away from the dock and beyond the lip when the lip is in a pendent position.

7. A dock leveler installation according to claim 5, wherein the first and second bumper are configured to retract toward the dock until a front face of the first bumper and front face of the second bumper are flush with or near a front face of the lip when the lip is in a pendent position.

\* \* \* \* \*

UNITED STATES PATENT AND TRADEMARK OFFICE
CERTIFICATE OF CORRECTION

PATENT NO. : 6,883,198 B2
DATED : April 26, 2005
INVENTOR(S) : James C. Alexander It is certified that error appears in the above-identified patent and that said Letters Patent is hereby corrected as shown below:

<u>Column 8,</u>
Line 41, please replace "level" with -- leveler --.

Signed and Sealed this

Twenty-eighth Day of June, 2005

JON W. DUDAS
*Director of the United States Patent and Trademark Office*